United States Patent [19]

Boots et al.

[11] Patent Number: 4,544,413
[45] Date of Patent: Oct. 1, 1985

[54] SOLUTION FOR CLEANING AND PRESERVING PLASTIC AND METALLIC SURFACES

[76] Inventors: Byron R. Boots, 26102 Eden Landing Rd., Ste. 3, Hayward, Calif. 94545; Buong P. Lau, 1201 E. Herndon Ave., Fresno, Calif. 93710

[21] Appl. No.: 589,978

[22] Filed: Mar. 15, 1984

Related U.S. Application Data

[63] Continuation of Ser. No. 295,415, Aug. 24, 1981, abandoned.

[51] Int. Cl.⁴ .......................... C08K 5/02; C08K 5/05; C08L 83/04
[52] U.S. Cl. .......................... 106/287.14; 106/287.16; 524/390
[58] Field of Search .................. 252/171, 172; 106/2, 106/3, 287.12, 287.14, 287.15, 287.16; 524/390

[56] References Cited

U.S. PATENT DOCUMENTS

| | | | |
|---|---|---|---|
| 3,639,131 | 2/1972 | Clarke | 106/2 |
| 4,062,794 | 12/1977 | Figiel | 252/171 |
| 4,131,561 | 12/1978 | Rousser | 252/171 |
| 4,183,819 | 1/1980 | Stoleve | 106/287.14 |
| 4,202,787 | 5/1980 | Davis | 252/172 |
| 4,260,510 | 4/1981 | Hey et al. | 252/172 |
| 4,268,407 | 5/1981 | Hey et al. | 252/172 |
| 4,269,739 | 5/1981 | Grejsner | 106/287.14 |

Primary Examiner—Allan M. Lieberman
Attorney, Agent, or Firm—Townsend and Townsend

[57] ABSTRACT

A chemical solution for use in cleaning and preserving vinyl materials, such as phonograph records, and metallic surfaces, such as the tape-engaging surfaces of read-write heads of audio and video tape recorders. The solution includes one or more solvents as carriers for a silicone, such as a dimethylsiloxane polymer. The silicone is in solution with a suitable organofunctional silane and with other intermediates, such as one or more alcohols, ethers, ketones and halogenated hydrocarbons. In other embodiments, the solution can be comprised of two or more solvents which serve as cleaners and preservatives.

1 Claim, No Drawings

SOLUTION FOR CLEANING AND PRESERVING PLASTIC AND METALLIC SURFACES

This is a continuation of application Ser. No. 295,415, filed Aug. 24, 1981 and now abandoned.

Phonograph records of vinyl material have been cleaned in the past with different types of solutions to remove dust and other foreign particles from the records. Such conventional cleaner solutions have also been used to try to improve the tonal qualities of the sounds reproduced from the records. For the most part, these attempts have not been satisfactory primarily because frequent applications of such conventional cleaning solutions to the records is required since such solutions have no long term effects. Conventional cleaning solutions are nothing more than a solvent which hardly provides improvements in tonal quality although they do have at least some minimal cleaning effect on vinyl records. As a result of the foregoing drawbacks, a need for improvements in cleaning solutions of this type has existed for some time. Such improvements include the removal of dust and dirt particles as well as the preservation and lubrication of vinyl records for long term use to avoid the need for frequent applications of cleaning solution thereto.

SUMMARY OF THE INVENTION

The present invention provides a cleaning solution which fills the aforesaid need. To this end, the solution of the present invention, when applied to a phonograph record of vinyl or other plastic material, cleans the record and provides a preservative therefore while lubricating the record. Thus, the record can be used over and over again while reproducing sounds of high quality and increased tonal separation and response throughout the entire auditory range. The solution also has an effect on phonograph needles and cartridges and can be used to clean, preserve and lubricate magnetic read-write heads for audio and video tape recorders. The solution operates to keep such needles, cartridges and heads clean, preserved and lubricated over long periods of time. This assures that desired tonal qualities, discernible by the most discriminating listeners of high fidelity sounds, will be reproduced from the records without frequent applications of the solution.

The solution of the present invention operates to toughen a vinyl surface by hardening the surface yet the solution makes the surface more resilient so that it will be able to withstand abrasive and other forces applied thereto. Specifically, the solution of the present invention, in a preferred form, essentially bonds a molecular layer of silicone or glass over the vinyl of a phonograph record, and the glass layer provides a lubricant while providing a perservative for the vinyl or other plastic material of the record. The layer is not really a coating; part of it actually becomes a part of the material of the record. The lubricating effect derives from the glass layer because of the lubricious qualities of the layer, yet the layer preserves the material of the record after having cleaned it of dirt, dust and other foreign particles. The result of the use of the solution is increased tonal separation and response throughout the entire auditory range over a long term without structural damage to the record.

The solution of the present invention contains one or more solvents which are highly volatile and leave only the slight residue of inert, anti-static, lubricating, surface-protecting layer mentioned above. In the case of some vinyl materials, there may be a super-thin bonding of another polymer of approximately several molecules thickness which will increase the hardness of the vinyl as well as to provide the above mentioned benefits. The solvent carriers in the solution of the present invention evaporate almost instantaneously upon application to a phonograph record and do not require a waiting period prior to the use of the record itself.

The solution is applied to a phonograph record with a cleaning pad or applicator while the record is rotating. The solution is applied in the amount of 0.001 ml to 5.0 ml per side. Excess application of the solution is not recommended but should not be harmful if wiped away immediately. The record may be played shortly after application of the solution and may thus be cleaned and treated as needed, although that should be infrequent as the treatment is substantially permanent on all but heavily played records if the record is stored away in an album during periods of non-use.

Tests have been conducted on a phonograph record treated with the solution of the present invention and such tests have established that, after only a single application of the solution to the record, the record can be played at least 230 times on a record player with an automatic changer and a cartridge load of ±4 grams. The test results also established that the the tonal quality and response of the sound from the playback after 230 plays of the record was as good as the first play of the record the solution was applied. There was no increase in surface noise and no increase in surface static during playback. The tonal response was excellent from the low end to the high end of the auditory range.

The solution of the present invention, in its preferred form, includes a silicone combined with vinyl-silane polymer or co-polymer, together with a solution with the proper intermediates, i.e., methyl alcohol, and other alcohols, ethers, ketones or halogenated hydrocarbons.

A suitable silicone is Dow Corning 200 Fluid which is a dimethylsiloxane polymer. Such a silicone has a water repellant capability, a lubricious feel, it is essentially non-toxic, and it has good rub-out characteristics. It also is available in a wide range of viscosities, typically from 0.65 to 100,000 centistrokes.

Suitable organofunctional silanes are Dow Corning products identified as Z-6026 aminofunctional silane, Z-6032 vinylbenzylamine functional silane, Z-6040 $\gamma$-glycidoxypropyltrimethoxy silane, Z-6062 mercaptopropyltrimethoxy silane, and Z-6075 vinyltriacetoxy silane.

Suitable ethers include diethylene glycol (DEG) monomethyl ether, diethylene glycol (DEG) monoethyl ether and others. Suitable alcohols include synthetically denatured alcohols (SDA) of ethanols, preferably 200 proof, isopropanol (IPA) and methanol. Suitable ketones include methyl ethyl ketone (MEK) and acetone. Suitable halogenated hydrocarbons include 1,1,2-trichloro-1,2,2-trifluoroethane ($CCl_2FCClF_2$), also known as Freon TF produced by DuPont.

A number of solutions are set forth in the following examples:

EXAMPLE 1

Isopropanol (anhydrous) (IPA)—5 ml
SDA—30 ml
MEK—10 ml
Methanol—30 ml
DEG monomethyl ether—10 ml DEG monoethyl ether—10 ml
Acetone—10 ml
Silicone (polymer) Sol. (Dow Corning 200 Fluid)—10 ml
HOH—60 ml In Example 1, a number of solvents are used, namely isopropanol, SDA, MEK and Acetone. These solvents are used for cleaning and/or preserving the vinyl material to which it is applied, and the solvents all have their own unique cleaning capabilities are different evaporative characteristics. In the case of the silicone, it provides a preservative for a vinyl surface and lubricates the same by providing a lubricating layer of siloxane polymer. It is well known to enhance the reproduced sound qualities of a phonograph record to dampen the surface of the record with a water mist. In effect, the silicone provides a virtually permanent dampening effect on the record because of its lubricious characteristics.

Other example is as follows:

EXAMPLE 2

SDA—75 ml
Methanol—75 ml
DEG monoethyl ether—2 ml
Silicone (polymer) Sol. (Dow Corning 200 Fluid)—2 ml
Halogenated hydrocarbons—46 ml The solution of Example 2 includes rapid-evaporating solvent-carriers which also act as intermediates for the polymers. The solvent-carriers leave extremely little residue, which dissolve contaminants on the surfaces of the vinyl material to be cleaned, such contaminants including vinyl mold-release and manufacturing residues, every day residues, and uncommon situation residues. The formula further requires ingredients which will beneficially treat polymers i.e., vinyl, and protect hard surfaces without producing any debilitating distortion upon reproduction, playback or other use.

Another example is as follows:

EXAMPLE 3

Isopropanol (anhydrous)—775 ml
Silicone (polymer) Sol. (Dow Corning 200 Fluid)—15 ml
Halogenated hydrocarbons—200 ml
Organoreactive silane (Dow Corning Z-6032 Silane 0.04% Sol. in methanol)—10 ml In Example 3, the silicone is bonded to the vinyl by the organoreactive silane which provides a permanent attachment of the silicone to the vinyl. Also, the isopropanol and halogenated hydrocarbons define solvents of different cleaning and evaporative characteristics.

EXAMPLE 4

SDA (and/or IPA anhydrous)—99.5%±
Silicone—0.5%±

EXAMPLE 5

Halogenated hydrocarbons—99.5%±
Silicone—0.5%±

EXAMPLE 6

SDA and halogenated hydrocarbons—99.5%±
Silicone—0.5%±

EXAMPLE 7

SDA and methanol—99.5%±
Silicone—0.5%±

EXAMPLE 8

SDA, methanol and halogenated hydrocarbon—99.5%±
Silicone—0.5%±

EXAMPLE 9

SDA and halogenated hydrocarbons—100%

EXAMPLE 10

Methanol and halogenated hydrocarbons—100%

Other formulations of the solution of the present invention can be formed by mixing a ketone, such as MEK, with each of the solutions of Examples 2-10; by substituting vinyl, vinyl-silicone, acrylic, or other polymers for the silicone of Examples 1-8; by adding an ether, such as DEG monomethyl ether 1.0%± or DEG monoethyl ether, to the solutions of Examples 3-10; by adding an alcohol, such as isopropanol, to the solutions of Examples 4-10; and by adding varying amounts of xylene, or toluene to the solutions of Examples 1-10 depending upon the type of material to be cleaned by the solution, i.e., VTR heads.

While the present invention has been described with reference to application to phonograph records of vinyl material, it is to be understood that the solution can be used to clean magnetic read-write heads associated with audio and video tape recorders. The solution of the present invention can also be of value in partially restoring old and worn phonograph records although several applications of the solution to the recording medium may be needed for records which have not been used for long periods of time.

What is claimed is:

1. A solution for cleaning and preserving plastic and metallic surfaces comprising: a solvent including anhydrous isopropanol; a vinyl benzylamine functional silane; halogenated hydrocarbons; and a silicone including dimethylsiloxane polymer in solution with the solvent and the silane, the silane and the silicone being operable to form a protective layer on a surface when the solution is applied thereto, said solvent being in the solution at a volume of approximately 775 parts per 1000, said silane being in the solution at a volume of approximately 10 parts per 1000, said halogenated hydrocarbons being in the solution at a volume of approximately 200 parts per 1000, and said silicone being in said solution at a volume of approximately 15 parts per 1000.

* * * * *